2,836,556

2,836,556

DRILLING MUD

William E. Thompson, Wallingford, and Chester N. White, Ridley Park, Pa., assignors to Sun Oil Company, Philadelphia, Pa., a corporation of New Jersey No Drawing. Application January 18, 1957
Serial No. 634,826

10 Claims. (Cl. 252—8.5)

This invention relates to aqueous drilling mud compositions of the type comprising an alkaline earth metal clay and to the treatment of such drilling muds for the purpose of improving their stability characteristics under well conditions.

In the drilling of oil or gas wells it is known to utilize as the drilling fluid an aqueous composition comprising a clay which has been converted to the alkaline earth metal form by treatment with an alkaline earth metal compound, as for example lime, and also which contains a lignosulfonate that serves as a dispersant for the clay particles. This type of drilling mud has certain advantages over the more common sodium base muds, particularly in drilling through gypsum, anhydrite or salt formations or in drilling out a cement plug; and such mud compositions and their advantages have been described in Barnes Patent No. 2,491,436. Drilling fluids of this kind usually are prepared from sodium base muds by adding lime and calcium ligno-sulfonate in amounts of 1–10 lbs./bbl. each and also adding caustic soda to raise the pH value to above 10. Additional amounts of lime and caustic soda may be added from time to time during the drilling operation to maintain a large excess of lime and to keep the alkalinity at the desired level, and further additions of calcium lignosulfonate may likewise be made to keep the clay particles dispersed and thereby maintain the mud in a sufficiently fluid condition. The excess of lime in the mixture is desirable in order to have a lime reserve that will continuously convert to the lime base form the new clay solids that become dispersed in the mud during drilling. It is also not uncommon to disperse oil in the limed compositions to form emulsion muds which have good lubricating properties and unusually low fluid loss.

While such lime base muds offer various advantages over ordinary drilling muds, it has been found that they have a tendency to undergo gelation and increase in viscosity when subjected to high temperature well conditions. This thickening effect generally does not occur at temperatures below 200° F. If the limed mud is subjected to higher temperatures, however, an inordinate increase in viscosity may occur. Such thickening of the drilling mud may take place during the course of drilling deep wells wherein temperatures up to 350° F. or higher may be encountered. In some instances where the drilling operation has been stopped and the mud has been allowed to stand quiescent in the borehole for a time, it has been found that gelation of the mud occurs to such extent that it becomes no longer pumpable and may even solidify. Perkins Patent No. 2,491,437 describes this problem and proposes one method of alleviating it by incorporating quebracho in the mud in addition to the lignosulfonate dispersant.

The present invention is directed to the problem of high temperature thickening of alkaline earth metal base drilling fluids, and it provides a new and effective manner of inhibiting or substantially preventing the viscosity increase and gelation that tends to occur at high temperature. According to the invention, a drilling mud comprising a hydradable alkaline earth metal clay, excess alkaline earth metal hydroxide and an organically derived clay dispersant is prevented from undergoing undue thickening at high temperature by incorporating therein finely divided silica. We have discovered that the presence of finely divided silica in such mud composition will reduce the heat thickening tendency without substantially affecting the viscosity and gel strength properties of the mud at relatively low temperatures.

It is believed that the thickening of limed muds at high temperatures is due to some reaction that occurs between the excess lime and the clay particles when the temperature is sufficiently high. Studies of heated limed muds utilizing X-rays and electron microscope tests have shown that changes in structure of the clay particles occur on heating, attendant with the increase in viscosity and gelation of the mud composition. The use of finely divided silica in accordance with the present invention is thought to be effective in inhibiting the thickening tendency because it interferes with the reaction of the lime with the clay particles. Silica will also undergo a reaction with lime at high temperature, and this reaction competes with the reaction of lime with the clay particles. By having a sufficient surface area of silica particles in the system, it appears that most of the excess lime can be made to react with the silica rather than with the clay and thus reduce the tendency of the composition to thicken. It will be understood, however, that this is a theoretical explanation of the effectiveness of the silica and that the actual mechanism by which it inhibits thickening of the composition cannot be stated with certainty at present.

Any form of high purity silica which provides sufficient surface area can be used in practicing the invention. The silica can be, for example, finely ground sand of high purity, diatomaceous earth or silica gel, and it should have a particle size mainly finer than 300 mesh (U. S. Sieve Series). The effectiveness of the silica generally increases as the size of the particles decrease. Silica gel, which has a large surface area due to its porous structure, is particularly effective for the present purpose.

The amount of silica to incorporate in the drilling mud composition will vary dependent upon the type of silica used, its particle size, the type and amount of clay in the composition, the amount of excess lime in the mixture and the well temperatures to which the mud is to be subjected. In any event a sufficient silica dosage should be employed to substantially inhibit the thickening of the mixture under well conditions. Usually the amount of the finely divided silica used will be in the range of 5–100% by weight based on the clay solids content of the composition, although other proportions may be used at times.

The preferred dispersant used in practicing the invention is lignosulfonate, which can be either an alkali metal or alkaline earth metal lignosulfonate. However, any other of the known organically derived clay dispersants which are soluble in the presence of alkaline earth metal ions can be used, including such dispersants as quebracho, gallic acid, crude or pre-solubilized lignin, and tannins.

It is recognized that in well drilling operations siliceous underground formations are often penetrated and that particles of siliceous material are removed from the well by the circulating drilling mud. This siliceous material is mainly removed from the mud by means of the shale shaker or by settlement in the mud pit, and it is substantially ineffective in preventing the mud from thickening under high temperature conditions. Hence, the drilling operation itself does not inherently provide in the mud composition siliceous particles of sufficient fineness and sufficient purity to achieve the purpose for which the finely divided silica is added in accordance with the invention.

The following examples are illustrative of the invention. A lime base drilling mud was prepared by dispersing 6% of a commercial bentonite in water and incorporating in the mixture 3 lbs./bbl. of calcium lignosulfonate (sold commercially under the trademark "Kembreak"), 4 lbs./bbl. of lime and 1 lb./bbl. of caustic soda. Finely divided silica was added to one portion of this base mud in amount of 5 lbs./bbl. and to another portion in amount of 20 lbs./bbl. The silica was finely ground sand of a particle size such that 95% would pass 325 mesh. The original mud and each of the batches containing silica were heated and maintained at 350° F. for 72 hrs. Viscosity and gel tests for the materials before and after heating were as follows:

| Silica added, lbs./bbl. | Stormer viscosity, cp. | | 10 min. gel strength, g. | |
| --- | --- | --- | --- | --- |
| | Before heating | After heating | Before heating | After heating |
| None | 11 | >270 | 2 | Too high. |
| 5 | 11 | 190 | 1 | 142. |
| 20 | 11 | 133 | 1 | 115. |

These results show that the presence of the silica, even in amount as low as 5 lbs./bbl., substantially reduced the change in viscosity and gel strengths upon heating. The heating conditions employed in these tests were severe compared to the conditions generally encountered in well drilling operations; hence the compositions had a greater tendency to thicken under the test conditions than they would in most well drilling operations. Furthermore, the bentonite used in preparing the base mud is much more reactive with lime than the clays usually present in field muds, so that more effective inhibition of the thickening effect is obtained with field muds. Also, more effective inhibition than indicated by the foregoing results could be obtained by using silica gel in place of the ground sand.

In utilizing the present invention in a well drilling operation, the drilling of the well may be conducted in conventional manner until a sufficiently high formation temperature is encountered to create a likelihood that the mud will thicken. Finely divided silica then may be added to the mud in sufficient amount to prevent any undue thickening of the composition.

While the invention has been described above mainly with reference to lime base drilling muds, it is to be understood that the invention is applicable to mud compositions containing other alkaline earth metal compounds.

This application is a continuation-in-part of our copending application, Serial No. 529,925, filed August 22, 1955, now abandoned.

We claim:

1. An aqueous drilling mud comprising a hydratable alkaline earth metal clay, excess alkaline earth metal hydroxide and a lignosulfonate selected from the group consisting of alkali metal and alkaline earth metal lignosulfonates, said drilling mud having added thereto finely divided silica mainly finer than 300 mesh in amount of at least 5% based on the clay solids content and sufficient to inhibit thickening of the composition when subjected to high temperature conditions.

2. A drilling mud according to claim 1 containing finely divided silica in amount of 5–100% based on the clay solids content.

3. A aqueous drilling mud comprising a hydratable calcium clay, excess lime and at least 1 lb./bbl. of calcium lignosulfonate, said drilling mud having a pH value of at least 10 and having added thereto finely divided silica mainly finer than 300 mesh in amount of at least 5% based on the clay solids content and sufficient to inhibit thickening of the composition when subjected to high temperature conditions.

4. A drilling mud according to claim 3 containing finely divided silica in amount of 5–100% based on the clay solids content.

5. In a drilling operation wherein a drilling mud comprising a hydratable alkaline earth metal clay, excess alkaline earth metal hydroxide and a lignosulfonate selected from the group consisting of alkali metal and alkaline earth metal lignosulfonates is introduced into the borehole and sufficiently high temperature conditions are encountered to tend to cause a thickening of the drilling mud, the steps of adding to the drilling mud finely divided silica mainly finer than 300 mesh in amount of at least 5% based on the clay solids content and sufficient to inhibit such thickening, and thereafter circulating the drilling mud through the borehole and thereby subjecting it to such temperature well conditions.

6. Method according to claim 5 wherein the silica is added in amount of 5–100% based on the clay solids content.

7. An aqueous drilling mud comprising a hydratable alkaline earth metal clay, excess alkaline earth metal hydroxide and an organically derived clay dispersant, said drilling mud having added thereto finely divided silica mainly finer than 300 mesh in amount of at least 5% based on the clay solids content and sufficient to inhibit thickening of the composition when subjected to high temperature conditions.

8. A drilling mud according to claim 7 having a pH value of at least 10 and in which the amount of finely divided silica added is 5–100% based on the clay solids content.

9. In a drilling operation wherein a drilling mud having a pH value of at least 10 and comprising a hydratable alkaline earth metal clay, excess alkaline earth metal hydroxide, and an organically derived clay dispersant is introduced into the borehole and sufficiently high temperature conditions are encountered to tend to cause a thickening of the drilling mud, the steps of adding to the drilling mud finely divided silica mainly finer than 300 mesh in amount of at least 5% based on the clay solids content and sufficient to inhibit such thickening and thereafter circulating the drilling mud through the borehole and thereby subjecting it to such high temperature well conditions.

10. Method according to claim 9 wherein said clay is a calcium clay, the alkaline earth metal hydroxide is lime and the silica is added in amount of 5–100% based on the clay solids content.

References Cited in the file of this patent

UNITED STATES PATENTS

| 2,109,337 | Mayfield | Feb. 22, 1938 |
| 2,491,436 | Barnes | Dec. 13, 1949 |
| 2,744,869 | Darley | May 8, 1956 |
| 2,771,420 | Rowe | Nov. 20, 1956 |